(12) United States Patent
Kitaura et al.

(10) Patent No.: US 10,441,917 B2
(45) Date of Patent: *Oct. 15, 2019

(54) GAS SEPARATION METHOD

(71) Applicants: SUMITOMO CHEMICAL COMPANY, LIMITED, Tokyo (JP); RENAISSANCE ENERGY RESEARCH CORPORATION, Kyoto-shi, Kyoto (JP)

(72) Inventors: Takenori Kitaura, Osaka (JP); Hisaaki Miyamoto, Osaka (JP); Yudai Ota, Osaka (JP); Takehiro Nakasuji, Osaka (JP); Osamu Okada, Kyoto (JP); Masaaki Teramoto, Kyoto (JP)

(73) Assignees: SUMITOMO CHEMICAL COMPANY, LIMITED, Tokyo (JP); RENAISSANCE ENERGY RESEARCH CORPORATION, Kyoto-shi, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,626

(22) Filed: Sep. 13, 2018

(65) Prior Publication Data

US 2019/0083926 A1    Mar. 21, 2019

(30) Foreign Application Priority Data

Sep. 15, 2017   (JP) .................................. 2017-177935

(51) Int. Cl.
  *B01D 53/22*   (2006.01)
  *B01D 69/12*   (2006.01)
  (Continued)

(52) U.S. Cl.
  CPC ............ *B01D 53/228* (2013.01); *B01D 53/22* (2013.01); *B01D 69/12* (2013.01); *B01D 69/142* (2013.01);
  (Continued)

(58) Field of Classification Search
  CPC .... B01D 71/68; B01D 2325/36; B01D 71/40; B01D 53/228; B01D 2203/0475;
  (Continued)

(56) References Cited

U.S. PATENT DOCUMENTS 3,231,345 A * 1/1966 Wilder ...................... C10L 5/40
                                                                  44/271
3,317,433 A * 5/1967 Eichel .................... B01J 13/025
                                                                  428/402.21

(Continued)

FOREIGN PATENT DOCUMENTS

EP    2 985 072 A1    2/2016
EP    3 305 394 A1    4/2018
                (Continued)

OTHER PUBLICATIONS

Communication dated Mar. 5, 2019 by the Japanese Patent Office in application No. 2017-177936.
(Continued)

*Primary Examiner* — Anthony R Shumate
(74) *Attorney, Agent, or Firm* — Sughrue Mion, PLLC

(57) ABSTRACT

Provided is a method for separating, from a raw gas containing a specific gas, the specific gas using a gas separation membrane module. The gas separation membrane module includes a housing and a gas separation membrane element enclosed in the housing. The gas separation membrane element includes a gas separation membrane including a hydrophilic resin composition layer for selectively allowing for permeation of the specific gas. The method includes the
(Continued)

steps of: increasing pressure in an interior of the gas separation membrane module; increasing a temperature in the interior of the gas separation membrane module; and feeding a raw gas to the interior of the gas separation membrane module in that order.

9 Claims, 3 Drawing Sheets

(51) Int. Cl.
    *B01D 71/40*     (2006.01)
    *B01D 71/68*     (2006.01)
    *B01D 71/82*     (2006.01)
    *B01D 69/14*     (2006.01)
    *B01D 71/38*     (2006.01)
    *B01D 71/76*     (2006.01)
    *B01D 63/10*     (2006.01)

(52) U.S. Cl.
    CPC ........... *B01D 69/145* (2013.01); *B01D 71/38* (2013.01); *B01D 71/40* (2013.01); *B01D 71/68* (2013.01); *B01D 71/76* (2013.01); *B01D 71/82* (2013.01); *B01D 63/10* (2013.01); *B01D 2256/16* (2013.01); *B01D 2257/504* (2013.01); *B01D 2311/04* (2013.01); *B01D 2311/08* (2013.01); *B01D 2311/103* (2013.01); *B01D 2311/14* (2013.01); *B01D 2311/2626* (2013.01); *B01D 2311/2669* (2013.01); *B01D 2313/23* (2013.01); *B01D 2325/36* (2013.01); *C01B 2203/0233* (2013.01); *C01B 2203/0475* (2013.01)

(58) Field of Classification Search
    CPC ............ B01D 2203/0233; B01D 69/12; B01D 2256/16; B01D 2257/504; B01D 71/82
    See application file for complete search history.

(56) References Cited

U.S. PATENT DOCUMENTS

| | | | | |
|---|---|---|---|---|
| 3,385,815 A | * | 5/1968 | Toshihiko | C08K 5/06 524/376 |
| 4,752,624 A | * | 6/1988 | Kim | B01D 71/54 521/137 |
| 4,778,596 A | * | 10/1988 | Linder | B01D 67/0088 210/490 |
| 4,859,039 A | * | 8/1989 | Okumura | G02B 5/205 359/487.02 |
| 5,186,835 A | * | 2/1993 | Masuoka | B01D 63/084 210/500.36 |
| 5,202,025 A | * | 4/1993 | Onishi | B01D 67/0093 210/500.35 |
| 5,240,472 A | | 8/1993 | Sircar | |
| 5,282,965 A | * | 2/1994 | Urairi | B01D 67/0088 210/500.36 |
| 5,834,528 A | * | 11/1998 | Tanaka | B01D 39/1692 521/145 |
| 2003/0054155 A1 | * | 3/2003 | Nomi | B32B 27/12 428/306.6 |
| 2011/0036237 A1 | * | 2/2011 | Okada | B01D 69/10 95/51 |
| 2011/0253621 A1 | * | 10/2011 | Kim | B01D 65/08 210/500.39 |
| 2012/0305472 A1 | * | 12/2012 | Yokota | B01D 69/02 210/500.23 |
| 2014/0111858 A1 | * | 4/2014 | Toyama | C08J 5/18 359/483.01 |
| 2014/0260968 A1 | * | 9/2014 | Li | B01D 19/0031 95/46 |
| 2015/0189748 A1 | * | 7/2015 | Iida | C23C 18/08 428/209 |
| 2015/0231576 A1 | * | 8/2015 | Stabler | B01D 39/163 210/500.35 |
| 2015/0321146 A1 | * | 11/2015 | Lin | B01D 61/364 210/500.28 |
| 2016/0186334 A1 | * | 6/2016 | Murahara | H01M 2/36 429/119 |
| 2017/0001142 A1 | * | 1/2017 | Rayner | B01D 53/1425 |
| 2017/0151534 A1 | * | 6/2017 | Fukuda | B01D 69/02 |

FOREIGN PATENT DOCUMENTS

| | | |
|---|---|---|
| JP | 6-170147 A | 6/1994 |
| JP | 2007-137788 A | 6/2007 |
| JP | 2009-195900 A | 9/2009 |
| JP | 4965927 B2 | 7/2012 |
| WO | 2016194832 A1 | 12/2016 |

OTHER PUBLICATIONS

Communication dated Mar. 5, 2019 by the Japanese Patent Office in application No. 2017-177935.
Communication dated Feb. 19, 2019 by the European Patent Office in application No. 18194406.7.
Communication dated Feb. 19, 2019 by the European Patent Office in application No. 18194411.7.

\* cited by examiner

GAS SEPARATION METHOD

STATEMENT OF JOINT RESEARCH AGREEMENT

The subject matter of the present application was made as a result of a joint research agreement within the meaning of 35 U.S.C. §§ 100(h) and 102(c) and 37 C.F.R. § 1.9(e) between SUMITOMO CHEMICAL COMPANY, LTD. and RENAISSANCE ENERGY RESEARCH CORPORATION.

BACKGROUND OF THE INVENTION

Field of the Invention

The present invention relates to a method for separating a specific gas using a gas separation membrane module.

Description of the Background Art

In recent years, as a process for separating a specific gas, such as carbon dioxide, from synthetic gases synthesized in plants for the production of hydrogen, urea, or the like, natural gases, exhaust gases, and the like, a gas membrane separation process has been attracting attention for being capable of realizing energy saving.

In a gas membrane separation process, a raw gas containing a specific gas to be separated is fed to the feed side of a gas separation apparatus including a gas separation membrane. As a gas component that permeates through the gas separation membrane, the specific gas is separated and recovered. In terms of the recovery rate and throughput of the specific gas, usually, the driving force for gas permeation (e.g., the working temperature and working pressure of the gas separation apparatus, the permeate pressure difference, etc.) is set relatively high (e.g., Japanese Patent No. 4965927).

SUMMARY OF THE INVENTION

The gas separation apparatus used for a gas membrane separation process usually includes a gas separation membrane module. The gas separation membrane module includes a housing and a gas separation membrane element that is enclosed in the housing and composed of one or more gas separation membranes accumulated.

An object of the present invention is to provide a gas separation method using a gas separation membrane module, which is capable of performing gas separation with excellent separation efficiency (separation selectivity).

The present invention provides the following gas separation method.

[1] A method for separating, from a raw gas containing a specific gas, the specific gas using a gas separation membrane module, the gas separation membrane module including a housing and a gas separation membrane element enclosed in the housing, the gas separation membrane element including a gas separation membrane including a hydrophilic resin composition layer for selectively allowing for permeation of the specific gas, the method including the steps of:

increasing a pressure in an interior of the gas separation membrane module;

increasing a temperature in the interior of the gas separation membrane module; and feeding the raw gas to the interior of the gas separation membrane module, in that order.

[2] The method according to [1], wherein in the step of increasing pressure, an inert gas is fed to increase the pressure in the interior of the gas separation membrane module.

[3] The method according to [2], wherein the inert gas has a water partial pressure lower than a maximum saturation water vapor pressure in the step of increasing a pressure.

[4] The method according to any one of [1] to [3], wherein in the step of increasing a pressure, the pressure on a feed side in the interior of the gas separation membrane module is increased.

[5] The method according to any one of [1] to [4], wherein the raw gas contains water vapor.

[6] The method according to [5], wherein in the step of increasing a temperature, the temperature in the interior of the gas separation membrane module is increased to a temperature higher than a dew point of the raw gas in the step of feeding the raw gas.

[7] The method according to any one of [1] to [6], wherein the hydrophilic resin composition layer contains a hydrophilic resin and an acidic gas carrier capable of reversibly reacting with an acidic gas.

[8] The method according to any one of [1] to [7], further comprising the steps of:

discharging a retentate gas that has not permeated through the gas separation membrane from the gas separation membrane module; and purifying the retentate gas.

[9] The method according to [8], wherein in the step of purifying the retentate gas, the purifying is conducted by at least one method selected from the group consisting of an adsorption method, a physical absorption method, a chemical absorption method, a distillation method, and a cryogenic separation method.

A gas separation method using a gas separation membrane module, which is capable of performing gas separation with excellent separation efficiency, can be provided.

The foregoing and other objects, features, aspects and advantages of the present invention will become more apparent from the following detailed description of the present invention when taken in conjunction with the accompanying drawings.

DESCRIPTION OF PREFERRED EMBODIMENTS

Figure 1:
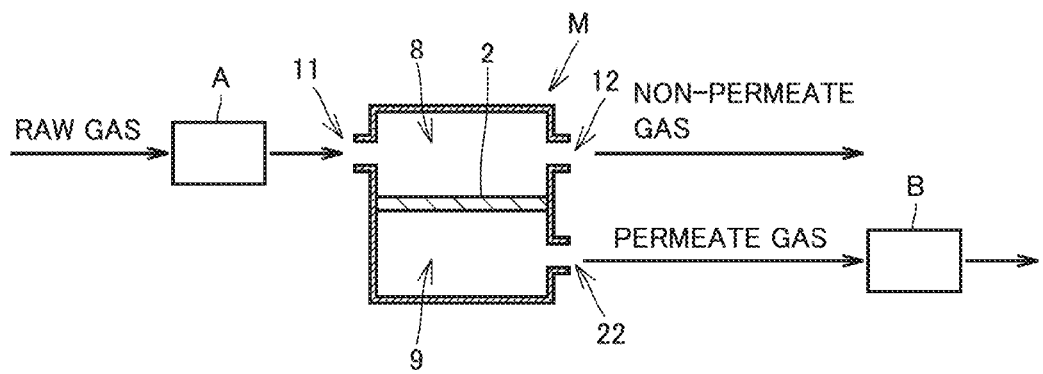
FIG. 1 is a diagram schematically showing an example of a gas separation apparatus including a gas separation membrane module.

Hereinafter, embodiments of the present invention will be described in detail. However, the present invention is not limited thereto, and various modifications can be made within the described scope. Embodiments obtained by combining technical means disclosed in different embodiments are also encompassed within the technical scope of the present invention.

The present invention relates to a gas separation method using a gas separation membrane module, for separating, from a raw gas containing a specific gas, the specific gas. In order to solve the above problems, the present invention particularly focuses on the start-up stage of the gas separation operation using a gas separation membrane module.

The gas separation membrane module includes a gas separation membrane element including a gas separation membrane and a housing (container) for enclosing the gas separation membrane element.

The gas separation method according to the present invention includes the following steps:

a step of increasing a pressure in an interior of the gas separation membrane module (pressure increase step);

a step of increasing a temperature in the interior of the gas separation membrane module (temperature increase step); and a step of feeding a raw gas to the interior of the gas separation membrane module (raw gas feeding step).

The gas separation method according to the present invention includes the pressure increase step, the temperature increase step, and the raw gas feeding step in that order.

According to the gas separation method described above, gas separation can be performed maintaining excellent separation efficiency.

As compared with the case where gas separation is performed on laboratory scale using a gas separation apparatus including a flat-shaped, small-area gas separation membrane in the form of a flat membrane as described in <Comparative Example 1> below, when gas separation is performed using a gas separation apparatus including a gas separation membrane element composed of one or more gas separation membranes accumulated, the separation efficiency generally tends to be lower.

According to the gas separation method described above, even in the case where gas separation is performed using a gas separation apparatus including a gas separation membrane element, or in the case where a large-scale gas separation process is performed using a gas separation apparatus including a gas separation membrane element, excellent separation efficiency can be exhibited, or the drop in separation efficiency as compared with the laboratory-scale gas separation described above can be suppressed.

Hereinafter, first, the gas separation apparatus that can be used for the gas separation method will be described, and then the gas separation method will be described.

<Gas Separation Apparatus and Gas Separation Membrane Module>

The gas separation apparatus is an apparatus for separating, from a raw gas containing a specific gas, the specific gas, and includes at least one gas separation membrane module.

The raw gas is a gas to be fed to a gas separation membrane module. The specific gas is a gas to be separated. An example of the specific gas is an acidic gas. The acidic gas refers to a gas having acidity, such as carbon dioxide ($CO_2$), hydrogen sulfide ($H_2S$), carbonyl sulfide, sulfur oxide ($SO_x$), nitrogen oxide ($NO_x$), and hydrogen halides such as hydrogen chloride.

FIG. 1 is a diagram schematically showing an example of a gas separation apparatus. The gas separation apparatus shown in FIG. 1 includes a gas separation membrane module M, a controller A for controlling the temperature, humidity, and pressure of the raw gas fed to gas separation membrane module M, and a back-pressure controller B for controlling the pressure of the permeate gas that has permeated through a gas separation membrane 2.

Gas separation membrane module M includes a feed-side gas flow channel 8 and a permeate-side gas flow channel 9. Feed-side gas flow channel 8 and permeate-side gas flow channel 9 are partitioned from each other by gas separation membrane 2.

Gas separation membrane module M includes a raw gas inlet 11 for introducing a raw gas into the interior thereof, a retentate gas outlet 12 for discharging a retentate gas that has not permeated through gas separation membrane 2, and a permeate gas outlet 22 for discharging a permeate gas that has permeated through gas separation membrane 2.

The gas separation apparatus is not limited to the example shown in FIG. 1 and may also include two or more gas separation membrane modules M. The arrangement and number of gas separation membrane modules M provided in the gas separation apparatus can be selected according to the required throughput and recovery rate of the specific gas, and the size of the place to install the gas separation apparatus.

Although not clearly shown in FIG. 1 as it is a schematic diagram, gas separation membrane module M includes a gas separation membrane element including gas separation membrane 2 and a housing (container) for enclosing the gas separation membrane element.

The housing is made of stainless steel, for example. Raw gas inlet 11, retentate gas outlet 12, and permeate gas outlet 22 can be provided, for example, in the housing.

Gas separation membrane module M includes a gas separation membrane element to be enclosed in the housing. The gas separation membrane element includes one or more gas separation membranes accumulated. The one or more gas separation membranes accumulated may be, for example, one gas separation membrane folded, wound, or processed in a combined manner, or two or more gas separation membranes piled, folded, wound, or processed in a combined manner.

Gas separation membrane module M may include one gas separation membrane element in the housing (single type). Alternatively, gas separation membrane module M may include two or more gas separation membrane elements to be enclosed in one housing. The arrangement and number of gas separation membrane elements can be selected according to the required recovery rate and throughput of the specific gas.

In the case where two or more gas separation membrane elements are disposed in the housing, two or more gas separation membrane elements may be arranged in parallel (parallel type) or in series (series type) in the housing. Arrangement in parallel at least means that a raw gas is distributed and introduced into the feed side of a plurality of gas separation membrane elements. Arrangement in series at least means that a retentate gas discharged from the discharge side of an upstream gas separation membrane element is introduced into the feed side of a downstream gas separation membrane element.

For example, in the case where two gas separation membrane elements are arranged in parallel in the housing, the configuration may be such that gas separation membrane elements are disposed apparently in series in the housing, a raw gas is fed from raw gas inlet 11 provided in the housing to the two gas separation membrane elements in parallel, and a retentate gas that has not permeated through gas separation membrane 2 of each gas separation membrane element is discharged from retentate gas outlet 12 provided in the housing. In this case, raw gas inlet 11 and retentate gas outlet 12 provided in the housing may each be provided for every gas separation membrane element, or may also be shared by the two gas separation membrane elements. Alternatively, it is also possible that raw gas inlet 11 is provided as a single, and retentate gas outlet 12 is provided for every gas separation membrane element, or, conversely, raw gas inlet 11 is provided for every gas separation membrane element, and retentate gas outlet 12 is provided as a single.

<Gas Separation Membrane Element>

The form of the gas separation membrane element included in gas separation membrane module M is not particularly limited, and may be a spiral-wound type, a hollow fiber type, a tube type, a pleated type, or a plate & frame type, and is preferably a spiral-wound type.

A spiral-wound gas separation membrane element includes a perforated core tube and a wound body wound around the core tube. The wound body is formed of a laminate including a flow channel member that forms a feed-side gas flow channel, a gas separation membrane including a hydrophilic resin composition layer, and a flow channel member forming a permeate-side gas flow channel laminated.

Hereinafter, embodiments of the spiral-wound gas separation membrane element will be described in detail with reference to the drawings.

Figure 2:
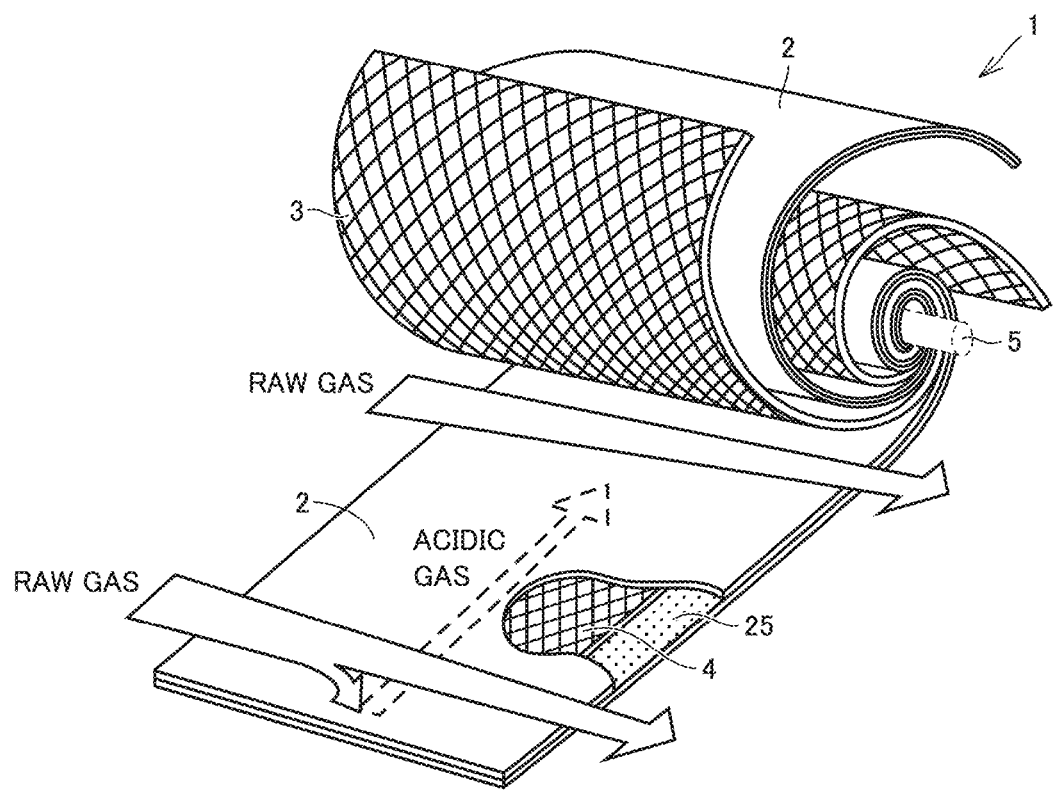
FIG. 2 is a schematic perspective view partially having a cutaway portion, showing an example of a spiral-wound gas separation membrane element developed.
Figure 3:
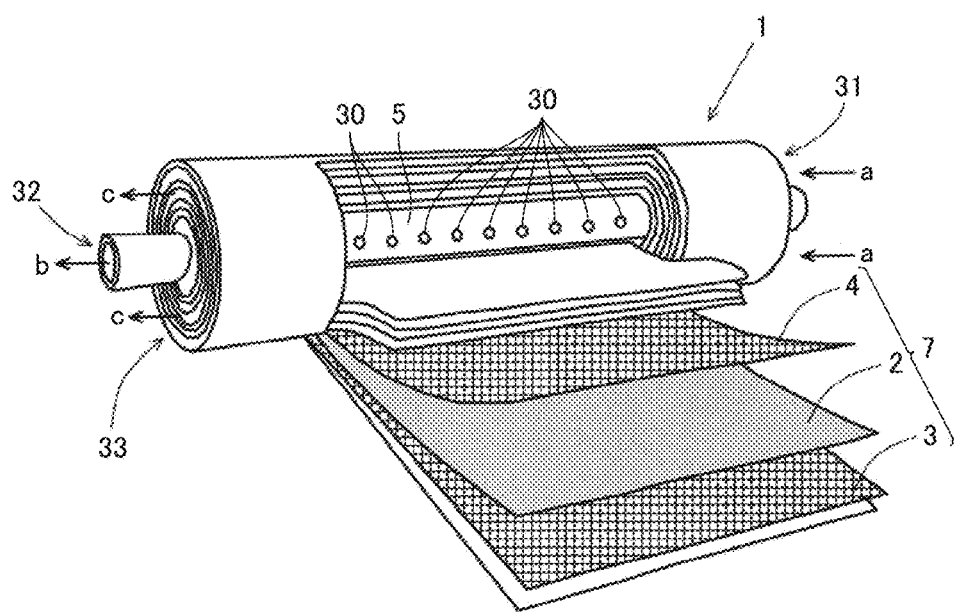
FIG. 3 is a schematic perspective view partially having a developed portion, showing an example of a spiral-wound gas separation membrane element.

FIG. 2 is a schematic perspective view partially having a cutaway portion, showing an example of a spiral-wound gas separation membrane element developed. FIG. 3 is a schematic perspective view partially having a developed portion, showing an example of a spiral-wound gas separation membrane element.

The layer structures of the spiral-wound gas separation membrane element and the wound body (laminate) shown in FIG. 2 and FIG. 3 are shown as examples, and the present invention is not limited to these examples.

A gas separation membrane element 1 shown in FIG. 2 and FIG. 3, which is a spiral-wound gas separation membrane element, includes at least one gas separation membrane 2, at least one flow channel member 3 forming a feed-side gas flow channel, and at least one flow channel member 4 forming a permeate-side gas flow channel, and may also include a wound body formed of a laminate 7, which is obtained by laminating them, wound around a core tube 5. The wound body may be in any shape, such as a circular cylinder or a polygonal cylinder. However, in the case of being enclosed in a housing (container) in a circular cylindrical shape, the wound body is preferably in a circular cylindrical shape.

The size of gas separation membrane element 1 is, in the case of being in the shape of a circular cylinder, such that the diameter is greater than or equal to 4 inches (about 10 cm), and the length is greater than or equal to 15 inches (about 38 cm), for example. Gas separation membrane element 1 usually has a diameter of less than or equal to 20 inches (about 51 cm) and a length of less than or equal to 100 inches (254 cm).

Gas separation membrane element 1 may further include a fixing member (not shown), such as an outer periphery tape or a telescope prevention plate (ATD), in order to prevent the wound body from rewinding or the collapse of winding. Further, in order to ensure the strength against the load due to the internal pressure and external pressure on gas separation membrane element 1, it is also possible to provide an outer lapping (reinforcing layer) on the outermost periphery of the wound body. The outer periphery tape is wound around the outer periphery of the wound body and thus can suppress the rewinding of the wound body. The telescope prevention plate is attached to each end portion of the wound body and can suppress the occurrence of the winding collapse (telescope) phenomenon in the wound body during the use of gas separation membrane element 1. As the outer lapping (reinforcing layer), a reinforcing material such as a fiber-reinforced resin made of glass fibers impregnated with an epoxy resin may be used. It is preferable that after the reinforcing material is wound around the outermost periphery of the wound body, the epoxy resin is cured.

(1) Wound Body

The wound body forming gas separation membrane element 1 may be composed of, for example, laminate 7 formed of flow channel member 4 forming a permeate-side gas flow channel, gas separation membrane 2, flow channel member 3 forming a feed-side gas flow channel, and gas separation membrane 2 repeatedly laminated in this order.

Flow channel member 3 forming a feed-side gas flow channel is a member to which a raw gas is fed, and the raw gas is fed to gas separation membrane 2 through this member.

Gas separation membrane 2 includes a first porous layer and a hydrophilic resin composition layer that separates a specific gas contained in the raw gas fed from flow channel member 3 forming a feed-side gas flow channel and allows the specific gas to permeate therethrough. The first porous layer is provided for the purpose of supporting the hydrophilic resin composition layer upon the separation of a specific gas from the raw gas using gas separation membrane 2, and is usually provided adjacent to the hydrophilic resin composition layer.

Flow channel member 4 forming a permeate-side gas flow channel is a member into which a permeate gas that has permeated through gas separation membrane 2 (containing at least part of the raw gas fed to gas separation membrane 2) flows, and guides the permeate gas to core tube 5.

Core tube 5 collects the permeate gas flowing through flow channel member 4 forming a permeate-side gas flow channel.

Gas separation membrane 2 constituting laminate 7 may include at least one second porous layer (protective layer) formed of a porous body. The second porous layer is disposed, for example, between gas separation membrane 2 and flow channel member 3 forming a feed-side gas flow channel. In addition, laminate 7 may include at least one third porous layer (reinforcement support layer) formed of a porous body. The third porous layer is disposed, for example, between gas separation membrane 2 and flow channel member 4 forming a permeate-side gas flow channel.

(2) Separation Membrane-Flow Channel Member Composite Body

Laminate 7 constituting the wound body includes a separation membrane-flow channel member composite body (membrane leaf). The separation membrane-flow channel member composite body is formed of gas separation membrane 2 folded in two and a flow channel member sandwiched in gas separation membrane 2 folded in two. The flow channel member sandwiched in gas separation membrane 2 folded in two is flow channel member 3 forming a feed-side gas flow channel, for example, but may also be flow channel member 4 forming a permeate-side gas flow channel. In the spiral-wound gas separation membrane element, the separation membrane-flow channel member composite body usually includes flow channel member 3 forming a feed-side gas flow channel.

In the case where the flow channel member sandwiched in gas separation membrane 2 folded in two is flow channel member 3 forming a feed-side gas flow channel, gas separation membrane 2 is folded in two with the first porous layer being on the outer side, that is, the first porous layer being on the outer side of the hydrophilic resin composition layer.

Depending on the type of gas separation membrane element, for example, gas separation membrane 2 may be folded in two with the hydrophilic resin composition layer being on the outer side of the first porous layer.

(3) Gas Separation Membrane 2

Gas separation membrane 2 constituting a separation membrane-flow channel member composite body includes a first porous layer formed of a porous body and a hydrophilic resin composition layer.

In order to achieve the separation and permeation of a specific gas contained in the raw gas flowing through flow channel member 3 forming a feed-side gas flow channel, the hydrophilic resin composition layer includes selective permeability for the specific gas. Gas separation membrane 2 can have selective permeability for a specific gas based on the dissolution/diffusion mechanism utilizing the difference between the solubility of gas molecules into the membrane and the diffusivity in the membrane. Gas separation membrane 2 preferably has selective permeability based on, in addition to the dissolution/diffusion mechanism, the facilitated transport mechanism, according to which a reaction product between a specific gas and a carrier is formed to promote the permeation of the specific gas. As a result, even higher selective permeability for a specific gas can be realized. The selective permeability based on the facilitated transport mechanism can be imparted by adding a carrier capable of reversibly reacting with a specific gas to the hydrophilic resin composition layer included in gas separation membrane 2.

The hydrophilic resin composition layer exhibits selective permeability for a specific gas in gas separation membrane 2 and has the function of allowing the specific gas to permeate therethrough.

In the case where a specific gas is $CO_2$, which is an acidic gas, it is preferable that the hydrophilic resin composition layer contains a $CO_2$ carrier capable of reversibly reacting with $CO_2$ in the raw gas, and it is more preferable that the layer is a gel-like thin membrane containing a hydrophilic resin composition containing a $CO_2$ carrier capable of reversibly reacting with $CO_2$ in the raw gas and a hydrophilic resin serving as a medium that holds the $CO_2$ carrier and moisture.

The thickness of the hydrophilic resin composition layer may be suitably selected according to the separation performance required for gas separation membrane 2, but is usually preferably within a range of greater than or equal to 0.1 μm and less than or equal to 600 μm, more preferable within a range of greater than or equal to 0.5 μm and less than or equal to 400 μm, and still more preferably within a range of greater than or equal to 1 μm and less than or equal to 200 μm.

As the hydrophilic resin contained in the hydrophilic resin composition layer, for example, in the case where the specific gas for which gas separation membrane 2 exhibits selective permeability is $CO_2$, which is an acidic gas, moisture is required for the reversible reaction between $CO_2$ and a $CO_2$ carrier, so that it is preferable that the hydrophilic resin has a hydrophilic group such as a hydroxyl group or an ion exchange group. It is more preferable that the hydrophilic resin includes a crosslinked hydrophilic resin, in which molecular chains are crosslinked to form a network structure, leading to high water-holding properties. Because a pressure difference is applied as a driving force for the permeation of a specific gas through gas separation membrane 2, it is preferable to use a hydrophilic resin including a crosslinked hydrophilic resin also in terms of the pressure resistance strength required for gas separation membrane 2.

In addition, in order to efficiently cause the reversible reaction between an acidic gas ($CO_2$, etc.) and an acidic gas carrier ($CO_2$ carrier, etc.), it is preferable that the raw gas contains water vapor.

It is preferable that the polymer forming the hydrophilic resin has, for example, a structural unit derived from an alkyl acrylate, an alkyl ester methacrylate, a vinyl ester of a fatty acid, or a derivative thereof. Examples of such polymers having hydrophilicity include polymers obtained by polymerizing monomers such as acrylic acid, itaconic acid, crotonic acid, methacrylic acid, and vinyl acetate. Specific examples thereof include resins having a carboxyl group as an ion exchange group, such as a polyacrylic acid resin, a polyitaconic acid resin, a polycrotonic acid resin, and a polymethacrylic acid resin; a polyvinyl alcohol resin having a hydroxy group; and copolymers thereof such as an acrylic acid-vinyl alcohol copolymer resin, an acrylic acid-methacrylic acid copolymer resin, an acrylic acid-methyl methacrylate copolymer resin, and a methacrylic acid-methyl methacrylate copolymer resin. Among them, a polyacrylic acid resin which is a polymer of acrylic acid, a polymethacrylic acid resin which is a polymer of methacrylic acid, a polyvinyl alcohol resin obtained by hydrolyzing a polymer of vinyl acetate, an acrylate-vinyl alcohol copolymer resin obtained by saponifying a copolymer of methyl acrylate and vinyl acetate, and an acrylic acid-methacrylic acid copolymer resin which is a copolymer of acrylic acid and methacrylic acid are more preferable, and polyacrylic acid and an acrylate-vinyl alcohol copolymer resin are still more preferable.

The crosslinked hydrophilic resin may be prepared by allowing a polymer having hydrophilicity to react with a crosslinking agent, or may also be prepared by copolymerizing a monomer that serves as the raw material of the polymer having hydrophilicity with a crosslinkable monomer. The crosslinking agent and the crosslinkable monomer are not particularly limited, and conventionally known crosslinking agents and crosslinkable monomers are applicable.

A carrier is a substance capable of reversibly reacting with a specific gas in the raw gas. By adding a carrier, the function of the hydrophilic resin composition layer to feed a specific gas in the raw gas to flow channel member 4 forming a permeate-side gas flow channel can be promoted. As a carrier, at least one kind of the carrier can be present in the hydrophilic resin composition layer containing a hydrophilic resin. The carrier reversibly reacts with a specific gas dissolved in water present in the hydrophilic resin composition layer, thereby selectively allowing the specific gas to permeate therethrough.

Specific examples of substances that function as carriers, which are capable of reversibly reacting with an acidic gas, include, in the case where the acidic gas is $CO_2$, alkali metal carbonates, alkali metal bicarbonates, alkanolamine (e.g., described in Japanese Patent No. 2086581, etc.) and alkali metal hydroxides (e.g., described in WO 2016/024523, etc.); in the case where the acidic gas is sulfur oxide, sulfur-containing compounds, citrates of alkali metals, and transition metal complexes (e.g., described in Japanese Patent No. 2879057, etc.); and, in the case where the acidic gas is nitrogen oxide, alkali metal nitrites and transition metal complexes (e.g., described in Japanese Patent No. 2879057, etc.).

In addition to the hydrophilic resin and the carrier capable of reversibly reacting with a specific gas, the hydrophilic resin composition layer may also contain, for example, a hydration catalyst for the acidic gas, and/or the below-described surfactant as additives. When the hydration catalyst for the acidic gas is used together, the reaction rate of the acidic gas and the carrier capable of reversibly reacting with the acidic gas can be improved.

As the hydration catalyst for the acidic gas, it is preferable that an oxo acid compound is contained, it is more preferable that at least one elemental oxo acid compound selected from the group consisting of group 14 elements, group 15 elements, and group 16 elements is contained, and it is still more preferable that at least one member selected from the group consisting of tellurious acid compounds, selenious acid compounds, arsenious acid compounds, and orthosilicic acid compounds is contained.

Gas separation membrane 2 includes a first porous layer. It is preferable that the first porous layer has porosity with high gas permeability so as not cause diffusion resistance against the gas component that has permeated through the hydrophilic resin composition layer. The first porous layer may have a single-layer structure or may also have a laminate structure including two or more layers. It is preferable that the member of the first porous layer has heat resistance according to the process conditions in plants for the production of hydrogen, urea, or the like, where gas separation membrane 2 is to be applied. As used herein, "heat resistance" means that after the member of the first porous layer or the like is stored for 2 hours under the temperature conditions equal to or higher than the process conditions, visually recognizable curling due to thermal contraction or thermofusion does not occur, for example, and the form before storage is maintained.

Examples of materials constituting the first porous layer include polyolefin resins such as polyethylene (PE) and polypropylene (PP); fluorine-containing resins such as polytetrafluoroethylene (PTFE), polyvinyl fluoride (PVF), and polyvinylidene fluoride (PVDF); polyester resins such as polyethylene terephthalate (PET), polyethylene naphthalate, and high-molecular-weight polyesters; resin materials such as polystyrene (PS), polyethersulfone (PES), polyphenylene sulfide (PPS), polysulfone (PSF), polyimide (PI), polyetherimide (PEI), polyetheretherketone (PEEK), heat-resistant polyamides, aramids, and polycarbonates; and inorganic materials such as metals, glasses, and ceramics. Among them, fluorine-containing resins and PP are more preferable.

The thickness of the first porous layer is not particularly limited. However, in terms of mechanical strength, usually, the thickness is preferably within a range of greater than or equal to 10 μm and less than or equal to 3000 μm, more preferably within a range of greater than or equal to 10 μm and less than or equal to 500 μm, and still more preferably within a range of greater than or equal to 15 μm and less than or equal to 150 μm. The average pore size of the pores of the first porous layer is not particularly limited, but is preferably less than or equal to 10 μm, and more preferably within a range of greater than or equal to 0.005 μm and less than or equal to 1.0 μm. The porosity of the first porous layer is preferably within a range of greater than or equal to 5% and less than or equal to 99%, and more preferably within a range of greater than or equal to 30% and less than or equal to 90%.

Gas separation membrane 2 may include a second porous layer provided on the surface of the hydrophilic resin composition layer on the opposite side from the first porous layer, for example, between the hydrophilic resin composition layer and flow channel member 3 forming a feed-side gas flow channel. During the production of gas separation membrane element 1, when the wound body is tightened, the hydrophilic resin composition layer and flow channel member 3 forming a feed-side gas flow channel may rub against each other. However, when the second porous layer is provided, the hydrophilic resin composition layer is protected, and the occurrence of damage due to the rubbing can be suppressed. The second porous layer is not particularly limited as long as it does not cause much friction with flow channel member 3 forming a feed-side gas flow channel, and its material has excellent gas permeability. However, a material having heat resistance according to the temperature conditions under which gas separation membrane 2 is used is preferable, and the same materials as those mentioned as materials for constituting the first porous layer may be suitably used, for example.

As the second porous layer, for example, a porous membrane, a nonwoven fabric, a woven fabric, or a net having an average pore size of greater than or equal to 0.001 μm and less than or equal to 10 μm can be suitably selected and used. The second porous layer may have a single-layer structure or may also have a laminate structure including two or more layers.

Gas separation membrane 2 may include a third porous layer provided on the surface of the first porous layer on the opposite side from the hydrophilic resin composition layer, for example, between the first porous layer and flow channel member 4 forming a permeate-side gas flow channel. When the third porous layer is provided, upon the production of gas separation membrane 2, in the step of forming the hydrophilic resin composition layer on the first porous layer used as a porous membrane to which a coating liquid is applied, strength that can withstand the tension load applied to the first porous layer can be additionally imparted. At the same time, upon the separation of a specific gas from the raw gas using gas separation membrane 2, strength that can withstand the pressure load applied to gas separation membrane 2 can be additionally imparted.

The third porous layer is not particularly limited as long as it has pressure resistance strength and stretch resistance, and its structure and material have gas permeability. However, a material having heat resistance according to the temperature conditions under which gas separation membrane 2 is used is preferable, and the same materials as those mentioned as materials for constituting the first porous layer may be suitably used, for example.

As the third layer, for example, a nonwoven fabric, a woven fabric, or a net having an average pore size of greater than or equal to 0.001 μm and less than or equal to 10 μm can be suitably selected and used. The third porous layer may have a single-layer structure or may also have a laminate structure including two or more layers.

(4) Flow Channel Member 3 Forming Feed-Side Gas Flow Channel

Flow channel member 3 forming a feed-side gas flow channel forms a flow channel space to which the raw gas is fed. This flow channel space introduces the raw gas into the interior of the wound body, and the raw gas is fed to gas separation membrane 2.

It is preferable that flow channel member 3 forming a feed-side gas flow channel has the function as a flow channel material that forms a flow channel space for the raw gas and also the function to minimize the pressure loss of the raw gas to be fed as much as possible while causing a turbulent flow in the raw gas to promote the surface renewal on the feed-side surface of gas separation membrane 2. From this point of view, it is preferable that flow channel member 3 forming a feed-side gas flow channel has a network shape (net-like, mesh-like, etc.). Depending on the network shape, the flow channel for the raw gas changes. Therefore, the shape of the unit cell of the network in flow channel member 3 forming a feed-side gas flow channel is preferably selected according to the purpose, for example, from a square, a rectangle, a rhombus, and a parallelogram.

As materials for constituting flow channel member 3 forming a feed-side gas flow channel, resins and inorganic materials such as metals, glasses, and ceramics can be mentioned. It is preferable that the material constituting flow channel member 3 forming a feed-side gas flow channel has heat resistance according to the temperature conditions under which gas separation membrane 2 is used. In addition, in terms of maintaining the function as a flow channel material that forms a flow channel space of the raw gas, it is preferable that the material constituting flow channel member 3 forming a feed-side gas flow channel has high mechanical strength (rigidity).

Examples of materials having high heat resistance and high rigidity include resin materials such as PE, PP, PTFE, PS, PPS, PES, PEEK, PI, and polycyclohexylene dimethylene terephthalate (PCT); inorganic materials such as metals, glasses, and ceramics; and materials combining a resin material and an inorganic material.

It is preferable that flow channel member 3 forming a feed-side gas flow channel includes a layer formed of a nonwoven fabric, a woven fabric, or a net containing at least one material selected from the group consisting of resins, metals, and glasses, and it is more preferable to include a layer formed of a nonwoven fabric, a woven fabric, or a net containing at least one material selected from the group consisting of PE, PP, PTFE, PS, PPS, PES, PEEK, PI, PCT, resins, metals, and glasses.

Flow channel member 3 forming a feed-side gas flow channel may have a single-layer structure or may also have a laminate structure including two or more layers. For example, a laminate structure including two or more of layers of the above nonwoven fabric, woven fabric, or net is also possible.

In terms of the pressure loss of the distributed gas and mechanical strength, the thickness of flow channel member 3 forming a feed-side gas flow channel (in the case of a laminate structure including a plurality of layers, the total thickness thereof) is preferably within a range of greater than or equal to 10 μm and less than or equal to 7500 μm, more preferably within a range of greater than or equal to 50 μm and less than or equal to 5000 μm, and still more preferably within a range of greater than or equal to 100 μm and less than or equal to 2500 μm.

(5) Flow Channel Member 4 Forming Permeate-Side Gas Flow Channel

Flow channel member 4 forming a permeate-side gas flow channel forms a flow channel space through which a permeate gas that has permeated through gas separation membrane 2 flows. This flow channel space introduces the permeate gas into core tube 5.

It is preferable that flow channel member 4 forming a permeate-side gas flow channel has the function as a flow channel material that forms a flow channel space for the permeate gas and also the function to cause a turbulent flow in the permeate gas to promote the surface renewal on the permeate-side surface of gas separation membrane 2. From this point of view, it is preferable that flow channel member 4 forming a permeate-side gas flow channel has a network shape (net-like, mesh-like, etc.). Depending on the network shape, the flow channel for the permeate gas changes. Therefore, the shape of the unit cell of the network in flow channel member 4 forming a permeate-side gas flow channel is preferably selected according to the purpose, for example, from a square, a rectangle, a rhombus, and a parallelogram.

The material constituting flow channel member 4 forming a permeate-side gas flow channel is not particularly limited. However, a material having heat resistance according to the temperature conditions under which gas separation membrane 2 is used is preferable, and the same materials as the resin materials mentioned as materials for constituting the first porous layer may be suitably used, for example. Specifically, PTFE, PES, PSF, PEEK, PI, and metals are preferable, and PTFE, PPS, PEEK, and metals are more preferable. Flow channel member 4 forming a permeate-side gas flow channel may have a single-layer structure or may also have a laminate structure including two or more layers.

(6) Core Tube

Core tube 5 is a conduct tube for collecting the permeate gas that has permeated through gas separation membrane 2 and discharging the same from gas separation membrane element 1. The material for core tube 5 is not particularly limited, but is preferably a material having heat resistance according to the temperature conditions under which gas separation membrane 2 is used. In addition, because gas separation membrane 2 is wound around the outer periphery several times to form a wound body, a material having mechanical strength is preferable. As a material for core tube 5, stainless steel is suitably used, for example. The diameter, length, and thickness of core tube 5 are suitably set according to the size of gas separation membrane element 1, the number of separation membrane-flow channel member composite bodies in laminate 7, the amount of permeate gas, and the mechanical strength required for core tube 5.

Core tube 5 is preferably a circular tube in the case where the wound body is in the shape of a circular cylinder, and is preferably a polygonal tube in the case where the wound body is in the shape of a polygonal cylinder.

As shown in FIG. 3, core tube 5 has a plurality of holes 30 on the outer peripheral surface of core tube 5. The holes 30 communicate between the flow channel space for the permeate gas in flow channel member 4 forming a permeate-side gas flow channel and the inner hollow space of core tube 5. The number of holes 30 and the size of holes 30 provided in core tube 5 are determined in consideration of the amount of permeate gas fed from flow channel member 4 forming a permeate-side gas flow channel or the mechanical strength required for core tube 5. Holes 30 provided in core tube 5 may be formed at equal intervals in the direction parallel to the axis of core tube 5, or may also be concentrated on one end side of core tube 5.

(7) Gas Separation by Gas Separation Membrane Element

When a raw gas is introduced into the housing from raw gas inlet 11 of gas separation membrane module M, the raw gas is continuously fed from a feed-side end portion 31 of gas separation membrane element 1 in the housing to flow channel member 3 forming a feed-side gas flow channel (the arrow a in FIG. 3), and a specific gas contained in the raw gas flowing through flow channel member 3 forming a feed-side gas flow channel permeates through gas separation membrane 2. The permeate gas that has permeated through gas separation membrane 2 flows in flow channel member 4 forming a permeate-side gas flow channel and is then fed to core tube 5 from holes 30, continuously discharged from the outlet 32 of core tube 5 (the arrow b in FIG. 3), and discharged from permeate gas outlet 22 of gas separation membrane module M, which communicates with the interior of core tube 5. Meanwhile, a retentate gas that has not permeated through gas separation membrane 2 is continuously discharged from a discharge-side end portion 33 of gas separation membrane element 1 (the arrow c in FIG. 3), and then discharged from retentate gas outlet 12 of gas separation membrane module M, which communicates with discharge-side end portion 33. In this manner, the specific gas can be separated from the raw gas.

<Gas Separation Method>

As described above, the gas separation method according to the present invention includes the following steps:

a step of increasing a pressure in the interior of gas separation membrane module M (pressure increase step);

a step of increasing a temperature in the interior of gas separation membrane module M (temperature increase step); and a step of feeding a raw gas to the interior of gas separation membrane module M (raw gas feeding step).

The gas separation method according to the present invention includes the pressure increase step, the temperature increase step, and the raw gas feeding step in that order.

(1) Pressure Increase Step

This step is a step of increasing the pressure in the interior of gas separation membrane module M.

The pressure in the interior of gas separation membrane module M is increased by feeding a gas to the interior of gas separation membrane module M, that is, to the interior of the housing.

The gas can be fed from, for example, an aperture such as a raw gas inlet 11, a retentate gas outlet 12, or a like that gas separation membrane module M has.

When the gas is fed, it is preferable that the interior of gas separation membrane module M to which the gas is fed is a closed system. As methods for establishing a closed system, for example, methods in which the apertures other than the aperture through which the gas is fed are closed, the valve of the gas line communicating with the aperture is closed, a back-pressure valve is provided and adjusted can be mentioned.

The gas is not particularly limited as long as it is different from the raw gas, but is preferably an inert gas. It is preferable that the inert gas is inert to gas separation membrane module M or gas separation membrane element 1 (and the hydrophilic resin composition layer included therein). The gas is preferably a nitrogen gas or a rare gas such as an argon gas or a helium gas, and more preferably a nitrogen gas.

In terms of preventing the moisture in the gas from condensing, it is preferable that the gas is a dry gas containing no moisture or having a sufficiently low moisture content.

In terms of preventing the moisture in the gas from condensing throughout the pressure increase step, it is preferable that the gas has a water partial pressure lower than the maximum saturation water vapor pressure in the pressure increase step, and it is more preferable that the water partial pressure is lower than the minimum saturation water vapor pressure in the pressure increase step.

The water partial pressure means the partial pressure that moisture in the gas shows in the pressure increase step. The maximum saturation water vapor pressure in the pressure increase step is, for example, in the case where the temperature in the interior of gas separation membrane module M varies in the pressure increase step, the saturation water vapor pressure at the highest temperature in the pressure increase step. The minimum saturation water vapor pressure in the pressure increase step is, for example, in the case where the temperature in the interior of gas separation membrane module M varies in the pressure increase step, the saturation water vapor pressure at the lowest temperature in the pressure increase step.

In terms of preventing the moisture in the gas from condensing throughout the pressure increase step, the moisture content of the gas is preferably less than or equal to 10 mass %, more preferably less than or equal to 5 mass %, and still more preferably less than or equal to 1 mass %.

In terms of obtaining excellent separation efficiency, it is preferable that the interior of gas separation membrane module M, where the pressure is increased in this step, includes the feed side of the interior of gas separation membrane module M, that is, feed-side gas flow channel 8 shown in FIG. 1. It is more preferable that of the feed side and permeate side of gas separation membrane module M, only the pressure on the feed side is increased.

In the embodiment where only the pressure on the feed side of gas separation membrane module M is increased, there is no state where the pressure on the permeate side is higher than the pressure on the feed side. This is advantageous for the protection of the gas separation membrane element.

In one embodiment, in terms of obtaining excellent separation efficiency, the pressure in the interior of gas separation membrane module M is increased to greater than or equal to 0.3 MPaG, for example. In this embodiment, the pressure in the interior of gas separation membrane module M is preferably increased to greater than or equal to 0.5 MPaG, more preferably increased to greater than or equal to 0.6 MPaG, and still more preferably increased to greater than or equal to 0.7 MPaG.

In addition, in another embodiment, in terms of obtaining excellent separation efficiency, the pressure in the interior of gas separation membrane module M is increased to greater than or equal to 25% of the working pressure, for example. In this embodiment, the pressure in the interior of gas separation membrane module M is preferably increased to greater than or equal to 45% of the working pressure, more preferably greater than or equal to 50% of the working pressure, and still more preferably greater than or equal to 60% of the working pressure.

The working pressure is the pressure of the raw gas fed in the below-described raw gas feeding step.

When the ultimate pressure in the pressure increase step is insufficient, sufficient separation efficiency may not be exhibited, or the suppressing effect on the drop in separation efficiency as compared with the case of gas separation on laboratory scale described above may not be sufficient.

The ultimate pressure in the pressure increase step may be a pressure equivalent to the working pressure, higher than working pressure, or lower than the working pressure.

The ultimate pressure in the pressure increase step is preferably usually less than or equal to 10 MPaG, and more preferably less than or equal to 8 MPaG.

In terms of obtaining excellent separation efficiency, after the pressure has been increased to the above pressure range, such a pressure range can be maintained (e.g., 1 minute to 5 hours). It is also possible that the pressure is reduced after the pressure increase step, and then the subsequent temperature increase step is performed. In the case where the pressure is reduced after the pressure increase step, and then the subsequent temperature increase step is performed, in terms of obtaining excellent separation efficiency, the pressure at the time of pressure reduction is preferably more than the atmospheric pressure, and more preferably greater than or equal to 0.1 MPaG.

In the pressure increase step, the temperature in the interior of gas separation membrane module M, where the pressure is increased, is usually equal to or higher than the outdoor temperature. In terms of suppressing the pressure fluctuation accompanying temperature changes due to heat dissipation to the outside, the temperature is the same as or equivalent to the outdoor temperature.

(2) Temperature Increase Step

This step is a step of increasing the temperature in the interior of gas separation membrane module M performed after the pressure increase step. "To increase the temperature" means to increase the temperature higher than the temperature in the pressure increase step. The temperature increase step may be performed with the interior of gas separation membrane module M being a closed system.

The temperature increase in the interior of gas separation membrane module M can be achieved by providing a heater in the exterior or interior of gas separation membrane module M, the exterior of gas separation membrane element 1, or two or more places selected from them.

Examples of heaters include jacket heaters, jackets or pipes that can be heated by distributing a heat medium, and induction heating devices. They can be used alone or in combination.

In terms of obtaining excellent separation efficiency, it is preferable that in the interior of gas separation membrane module M, at least a place where the pressure has been increased in the pressure increase step is subjected to the temperature increase.

In one embodiment, in the case where the raw gas contains water vapor, in terms of obtaining excellent separation efficiency, the temperature in the interior of gas separation membrane module M is increased to a temperature higher than the dew point of the raw gas in the raw gas feeding step described below. As a result, gas separation can be performed with sufficient separation efficiency while preventing condensation of moisture in the raw gas.

In addition, in another embodiment, in terms of obtaining excellent separation efficiency, the temperature in the interior of gas separation membrane module M is preferably increased to higher than or equal to 100° C., more preferably increased to higher than or equal to 105° C., and still more preferably increased to higher than or equal to 110° C. When the ultimate temperature in the temperature increase step is less than 100° C., sufficient separation efficiency may not be exhibited, or the suppressing effect on the drop in separation efficiency relative to the case of gas separation on laboratory scale described above may not be sufficient.

Considering the design temperature in the gas separation operation, the ultimate temperature in the temperature increase step is usually preferably lower than or equal to 200° C., and more preferably lower than or equal to 150° C.

In terms of obtaining excellent separation efficiency, the difference between the ultimate temperature in the interior of gas separation membrane module M in the temperature increase step and the temperature in the interior of gas separation membrane module M in the pressure increase step is preferably higher than or equal to 10° C., more preferably higher than or equal to 30° C., and still more preferably higher than or equal to 60° C.

In terms of obtaining excellent separation efficiency, after the temperature has been increased to the above temperature range, such a temperature range may be maintained (e.g., 1 minute to 50 hours).

In the temperature increase step, the pressure in the interior of gas separation membrane module M, where the temperature is increased, is not particularly limited. For example, in the case where the temperature increase step is performed in a closed system, the pressure in the interior of gas separation membrane module M in the temperature increase step can be higher than the ultimate pressure in the pressure increase step. In the case where the temperature increase step is performed in an open system, for example, the pressure in the interior of gas separation membrane module M in the temperature increase step may be lower than the ultimate pressure in the pressure increase step.

(3) Raw Gas Feeding Step

This step is a step of feeding a raw gas to the interior of gas separation membrane module M, which is performed after the temperature increase step. The raw gas is fed from a raw gas inlet 11 to the feed side of gas separation membrane module M. As a result of feeding the raw gas, the gas separation operation is started.

It is preferable that the temperature, humidity, and pressure of the raw gas fed to the interior of gas separation membrane module M have been adjusted with a controller A (FIG. 1). As described above, when water vapor is contained in the raw gas, the reversible reaction between an acidic gas ($CO_2$, etc.) and an acidic gas carrier ($CO_2$ carrier, etc.) can be promoted, whereby the separation efficiency can be enhanced.

The temperature of the raw gas fed to the interior of gas separation membrane module M and the temperature in the interior of gas separation membrane module M at the start of raw gas feeding may be the same as, higher than or equal to, or lower than or equal to the ultimate temperature in the interior of gas separation membrane module M in the temperature increase step.

In one embodiment, the temperature of the raw gas fed to the interior of gas separation membrane module M and the temperature in the interior of gas separation membrane module M at the start of raw gas feeding are higher than or equal to 100° C. and lower than or equal to 200° C., for example, and preferably higher than or equal to 110° C. and lower than or equal to 150° C.

The pressure of the raw gas fed to the interior of gas separation membrane module M and the pressure in the interior of gas separation membrane module M at the start of raw gas feeding are, in terms of separation efficiency, preferably greater than or equal to 0.5 MPaG and less than or equal to 10 MPaG, more preferably greater than or equal to 0.6 MPaG and less than or equal to 8 MPaG, and still more preferably greater than or equal to 0.7 MPaG and less than or equal to 8 MPaG.

By continuously feeding the raw gas to the interior of gas separation membrane module M, the gas separation operation can be continuously performed. The temperature and pressure in the interior of gas separation membrane module M at the time of continuous operation are the same as the temperature and pressure at the start of raw gas feeding described above, respectively.

During the period from the start of raw gas feeding to the suspension of the gas separation operation, or in part of the period, a sweep gas selected from inert gases may be fed to the permeate side of gas separation membrane module M. The sweep gas, can be fed into core tube 5 of gas separation membrane element 1.

When the raw gas is continuously fed to the interior of gas separation membrane module M, the retentate gas that has not permeated through gas separation membrane 2, from which a specific gas that has permeated through gas separation membrane 2 provided in gas separation membrane element 1 has been separated and removed, is continuously discharged from retentate gas outlet 12 of gas separation membrane module M.

In one embodiment, this retentate gas is fed to a step of purifying the retentate gas. The retentate gas purification step may be a step utilizing an adsorption method, a physical absorption method, a chemical absorption method, a distillation method, or a cryogenic separation method.

For example, in the case of hydrogen production, as a result of a first purification step in which a synthetic gas containing $H_2$ and $CO_2$ synthesized by steam reforming is fed to gas separation membrane module M, a roughly purified hydrogen gas (retentate gas) obtained by separating and removing part of $CO_2$ contained in the synthetic gas is obtained. Subsequently, the roughly purified hydrogen gas is fed to a second purification step utilizing a chemical absorption method to separate and remove $CO_2$ contained in the roughly purified hydrogen gas, whereby a purified hydrogen gas can be obtained. According to $CO_2$ separation including the first purification step using gas separation membrane module M, as compared with the case where the first purification step is not preformed, the amount of heat energy consumption required for the entire purification step can be suppressed low.

EXAMPLES

Hereinafter, the present invention will be described in further detail through examples and comparative examples. However, the present invention is not limited to these examples.

Comparative Example 1

(1) Fabrication of Gas Separation Apparatus Including Flat-Shaped Gas Separation Membrane and Evaluation of Separation Efficiency (Separation Selectivity)

2 g of a PVA (polyvinyl alcohol)/PAA (polyacrylic acid) cesium salt copolymer obtained by the method described in WO 2014/157069 as a hydrophilic polymer, 4.67 g of cesium carbonate as a carrier, and 0.025 times the number of moles of tellurite relative to cesium carbonate as an additive were added to 80 g of water, and stir-mixed to prepare a coating liquid.

The obtained coating liquid was applied onto the hydrophilic PTFE porous membrane side of a two-layer porous membrane including a hydrophilic PTFE porous membrane ("WPW-020-80" manufactured by Sumitomo Electric Fine Polymer, Inc., thickness: 80 μm, pore size: 0.2 μm) and a hydrophobic PTFE membrane ("Fluoropore FP010" manufactured by Sumitomo Electric Fine Polymer, Inc., thickness: 60 μm, pore size: 0.1 μm) using an applicator (application thickness: 500 μm), then allowed to dry naturally at room temperature, and further dried at 120° C. for 2 hours to form a hydrophilic resin composition layer, thereby giving a gas separation membrane.

Figure 4:
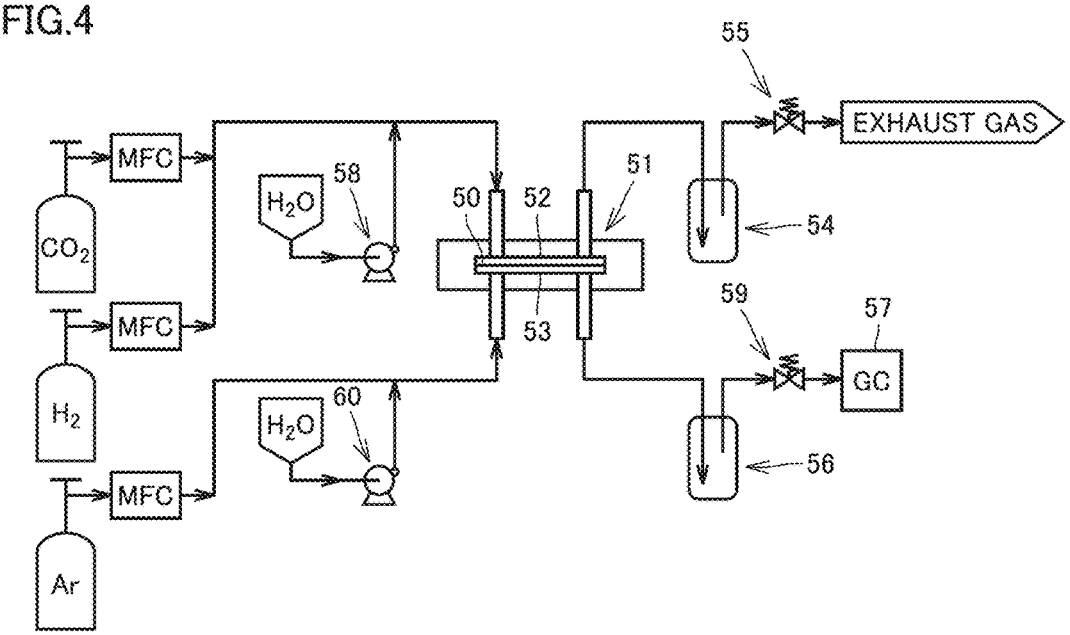
FIG. 4 is a schematic diagram of a gas separation apparatus including a flat-shaped gas separation membrane.

Using the gas separation membrane obtained above, the gas separation apparatus equipped with a gas separation membrane module 51 including a flat-shaped gas separation membrane shown in FIG. 4 was fabricated. The gas separation membrane obtained above was cut into a size of 5 cm×5 cm, and the resulting flat membrane sample 50 was set in a flow-type gas permeation cell made of stainless steel, and fixed using an O-ring made of fluoro-rubber as a sealant between a feed-side chamber 52 and a permeate-side chamber 53, thereby fabricating gas separation membrane module 51.

Although not shown in FIG. 4, in order for the temperatures of gas separation membrane module 51, the raw gas, and the sweep gas to be maintained constant, the cell and the pipe for feeding gases to gas separation membrane module 51 is installed in a thermostat that can be set at a predetermined temperature.

Using this gas separation apparatus, a gas separation operation was performed according to the following procedures, and the ratio ($CO_2/H_2$) of $CO_2$ permeance to $H_2$ permeance was measured.

[a] After the fabrication of a gas separation apparatus equipped with gas separation membrane module 51, a dry nitrogen gas was fed from the raw gas inlet on the feed side of gas separation membrane module 51 for 12 hours to turn a flat membrane sample 50 into a dry state.

Subsequently, the temperature of the cell was increased to 120° C. using the thermostat.

[b] Next, a raw gas ($CO_2$: 23.6%, $H_2$: 35.4%, $H_2O$: 41.0%) was heated to 120° C., and the heated raw gas was fed to the feed side of gas separation membrane module 51 at a flow rate of 0.0347 mol/min. Subsequently, a sweep gas (Ar: 20%, $H_2O$: 80%) heated to 120° C. was fed to the permeate side of gas separation membrane module 51 at a flow rate of 0.00777 mol/min. $H_2O$ was sent using liquid-sending metering pumps 58 and 60, heated, and evaporated to adjust the $H_2O$ mixing ratio and flow rate as above.

The pressure on the feed side of gas separation membrane module 51 was increased for the first time as a result of raw gas feeding, and adjusted to 500 kPaG with a back-pressure controller 55 provided on the downstream side of a cold trap 54 in the middle of the discharge passage for a retentate gas. In addition, a back-pressure controller 59 was provided also between a cold trap 56 and a gas chromatograph 57, and the pressure on the permeate side was adjusted therewith to the atmospheric pressure.

[c] After 3 hours from the start of raw gas feeding, the permeate gas after water vapor in the sweep gas discharged from the permeate side was removed with cold trap 56 was analyzed with gas chromatograph 57. The permeance of $CO_2$ and $H_2$ (mol/m²s kPa) contained the permeate gas were calculated, and the ratio ($CO_2/H_2$) of $CO_2$ permeance to $H_2$ permeance was determined. Hereinafter, this permeance ratio is referred to as "permeance ratio H0."

(2) Fabrication of Gas Separation Apparatus Including Gas Separation Membrane Element and Evaluation of Separation Efficiency (Separation Selectivity)

Using the same gas separation membrane as the gas separation membrane used in (1) above, a spiral-wound gas separation membrane element was fabricated. The details of the members used for the fabrication of the gas separation membrane element are as follows.

Flow channel member for forming a feed-side gas flow channel:
PPS net (50×50 mesh) ("50-150PPS" manufactured by Dio Chemicals, Ltd.)

Flow channel member for forming a permeate-side gas flow channel:
Three layers of PPS nets (50×50 mesh/60×40 mesh/50×50 mesh) ("50-150PPS" and "60(40)-150PPS" manufactured by Dio Chemicals, Ltd.)

Core tube:

Made of stainless steel having an outer diameter of 1 inch, with 20 3-mm-diameter holes in total formed in the outer periphery of the core tube. The holes are formed in two lines in the direction parallel to the axis of the core tube. Ten holes are formed per line at an equal interval of 25.4-mm pitch over the region in the direction parallel to the axis of the core tube, around which a laminate is wound. The two lines are placed to face each other across the axis of the core tube.

Using an adhesive, one end of a first-layer flow channel member forming a permeate-side gas flow channel was fixed to the core tube. Of both end portions in the direction parallel to the axis of the core tube and end portions located at both ends in the direction orthogonal to the axis of the core tube on one surface of the separation membrane-flow channel member composite body obtained above, along the end portion on the side far from the core tube, an adhesive was applied in a belt-like form. In such a manner that the application surface faced the flow channel member forming a permeate-side flow gas channel, a first-layer separation membrane-flow channel member composite body was laminated on the first-layer flow channel member forming a permeate-side gas flow channel. The separation membrane-flow channel member composite body was laminated to be spaced away from the core tube.

Subsequently, an adhesive was applied in a belt-like form to the exposed surface of the first-layer separation membrane-flow channel member composite body in the same manner as above, and then a second-layer flow channel member forming a permeate-side gas flow channel was laminated.

In the same manner as with the first-layer separation membrane-flow channel member composite body, a second-layer separation membrane-flow channel member composite body was laminated on the second-layer flow channel member forming a permeate-side gas flow channel. At this time, the lamination position of the second-layer separation membrane-flow channel member composite body was more spaced away from the core tube than the second-layer flow channel member forming a permeate-side gas flow channel.

Subsequently, of both ends in the direction parallel to the axis of the core tube where the separation membrane-flow channel member composite body was not laminated and end portions located at both ends in the direction orthogonal to the axis of the core tube in each flow channel member forming a permeate-side gas flow channel included in the laminate, an adhesive was applied to an end portion on the side far from the core tube. An adhesive was also applied to both end portions in the direction parallel to the axis of the core tube in the separation membrane-flow channel member composite body on the uppermost surface. The laminate was wound around a core tube, and, as an outer periphery tape, a heat-resistant tape was wound around the outer periphery of the wound body. Subsequently, both end portions of the wound body in direction parallel to the axis of the wound body were cut, and a telescope prevention plate was attached in contact with the cut surface of each end portion. Then, on the outermost periphery of the wound body, an outer lapping (reinforcing layer) was formed using a fiber-reinforced resin made of glass fibers impregnated with an epoxy resin, thereby forming a gas separation membrane element 70. The obtained gas separation membrane element 70 had a diameter of 4 inches (about 10 cm) and a length of 15 inches (about 38 cm).

Figure 5:
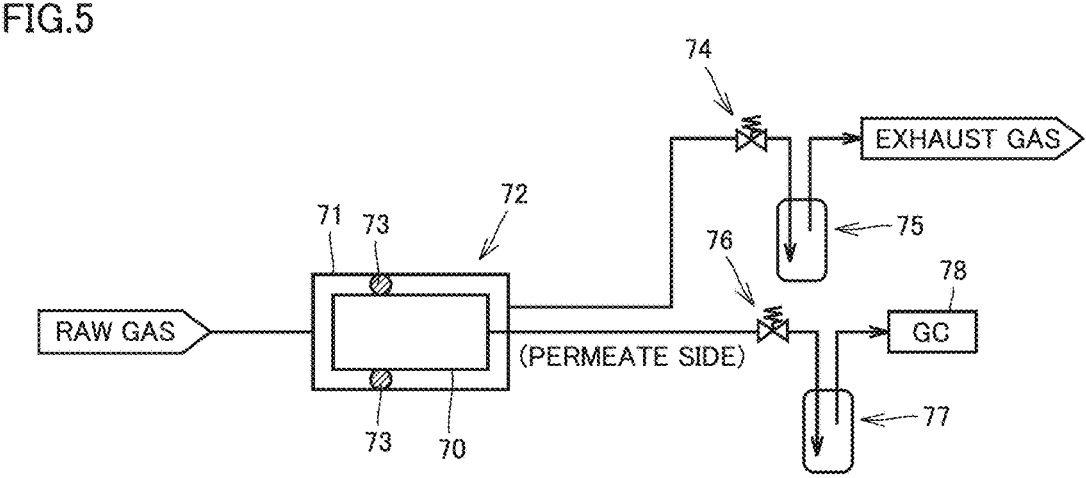
FIG. 5 is a schematic diagram of a gas separation apparatus including a gas separation membrane element.

One obtained gas separation membrane element 70 was enclosed in a housing 71 made of stainless steel to give a gas separation membrane module 72. Using separation membrane module 72, a gas separation apparatus shown in FIG. 5 was fabricated. As shown in FIG. 5, in gas separation membrane module 72, the gap between gas separation membrane element 70 and housing 71 was sealed with a sealant 73 so that the gas fed into housing 71 was fed into gas separation membrane element 70.

Using the obtained gas separation apparatus including a gas separation element, a gas separation operation was performed according to the following procedures, and the ratio ($CO_2/H_2$) of $CO_2$ permeance to $H_2$ permeance was measured.

[a] From the raw gas inlet of gas separation membrane module 72, a dry nitrogen gas was fed for 12 hours to turn the gas separation membrane of gas separation membrane element 70 into a dry state. Subsequently, using a steam tube attached to the outer surface of gas separation membrane module 72, the temperature on the feed side of gas separation membrane module 72 was increased to 120° C.

[b] Next, the temperature on the feed side was maintained at the above temperature for 120 minutes, and then a raw gas of 1.5 MPaG and 120° C. ($CO_2$: 25.0%, $H_2$: 67.4%, $H_2O$: 7.6%) was fed at a flow rate of 10 $Nm^3/h$ from the raw gas inlet of gas separation membrane module 72 to the feed side of gas separation membrane module 72. The flow rate of the raw gas was adjusted with a back-pressure controller 74 provided on the upstream side of a cold trap 75 in the middle of the discharge passage for a retentate gas. The pressure on the feed side of gas separation membrane module 72 was increased for the first time as a result of raw gas feeding and became 1.5 MPaG. The pressure on the permeate side was adjusted to the atmospheric pressure with a back-pressure controller 76.

[c] After 3 hours from the start of raw gas feeding, the permeate gas after water vapor in the permeate gas discharged from the permeate gas outlet of gas separation membrane module 72 was removed with a cold trap 77 was analyzed with a gas chromatograph 78. The permeances of $CO_2$ and $H_2$ ($mol/m^2s\ kPa$) contained the permeate gas were calculated, and the ratio ($CO_2/H_2$) of $CO_2$ permeance to $H_2$ permeance was determined. Hereinafter, this permeance ratio is referred to as "permeance ratio H1."

The ratio (H1/H0) of permeance ratio H1 to permeance ratio H0 was a value smaller than 0.05.

Example 1

(1) Fabrication of Gas Separation Apparatus Including Flat-Shaped Gas Separation Membrane and Evaluation of Separation Efficiency (Separation Selectivity)

4 g of crosslinked polyacrylic acid ("AQUPEC HV-501" manufactured by Sumitomo Seika Chemicals Co., Ltd.) and 0.8 g of polyacrylic acid ("AQUPAANA AP-40F" manufactured by Sumitomo Seika Chemicals Co., Ltd., 40% Na saponification) as hydrophilic polymers and 10.5 g of cesium hydroxide monohydrate were added to 188 g of water, and subjected to neutralization with stirring. After the completion of neutralization, 10 g of cesium carbonate and 1.2 g of a surfactant ("Surflon S-242" manufactured by AGC Seimi Chemical Co., Ltd.) were added and mixed, thereby preparing a coating liquid.

The obtained coating liquid was applied to a hydrophobic PTFE porous membrane ("POREFLON HP-010-50" manufactured by Sumitomo Electric Fine Polymer, Inc., thickness: 50 μm, pore size: 0.1 μm) to serve as a first porous layer, and then dried at a temperature of about 120° C. for 5 minutes, thereby forming a coating film. Further, the application and drying of the coating liquid were repeated several times to form a hydrophilic resin composition layer on the first porous layer, thereby obtaining a gas separation membrane.

Using the gas separation membrane obtained above, a flat membrane sample 50 was fabricated in the same manner as in (1) of Comparative Example 1, and the gas separation apparatus equipped with a gas separation membrane module 51 including a flat-shaped gas separation membrane shown in FIG. 4 was fabricated. Using this gas separation apparatus, a gas separation operation was performed according to the following procedures, and the ratio ($CO_2/H_2$) of $CO_2$ permeance to $H_2$ permeance was measured.

[a] After the fabrication of a gas separation apparatus equipped with gas separation membrane module 51, a dry nitrogen gas was fed from the raw gas inlet on the feed side of gas separation membrane module 51 for 12 hours to turn flat membrane sample 50 into a dry state.

Subsequently, the retentate gas outlet on the feed side was closed, and a dry nitrogen gas at 23° C. was fed to the feed side of gas separation membrane module 51 to increase the pressure on the feed side to 350 kPaG. Subsequently, the feeding of the dry nitrogen gas was stopped to keep the pressure at 350 kPaG. The pressure on the permeate side was adjusted to the atmospheric pressure.

[b] The pressure on the feed side was maintained at the above pressure value for 120 minutes, and then temperature of the cell was increased to 120° C. using the thermostat. The pressure on the feed side of gas separation membrane module 51 was 500 kPaG.

[c] Next, the temperature on the feed side was maintained at the above temperature for 120 minutes. Subsequently, the raw gas ($CO_2$: 23.6%, $H_2$: 35.4%, $H_2O$: 41.0%) was heated to 120° C., and the heated raw gas was fed to the feed side of gas separation membrane module 51 at a flow rate of 0.0347 mol/min. As the same time, a sweep gas (Ar: 20%, $H_2O$: 80%) heated to 120° C. was fed to the permeate side of gas separation membrane module 51 at a flow rate of 0.00777 mol/min. The pressure on the feed side of gas separation membrane module 51 was adjusted to 500 kPaG with a back-pressure controller 55 provided on the downstream side of a cold trap 54 in the middle of the discharge passage for a retentate gas. $H_2O$ was sent using each of liquid-sending metering pumps 58 and 60, heated, and evaporated to adjust the $H_2O$ mixing ratio and flow rate as above. In addition, the pressure on the permeate side was adjusted to the atmospheric pressure with a back-pressure controller 59.

[d] After 3 hours from the start of raw gas feeding, the permeate gas after water vapor in the sweep gas discharged from the permeate side was removed with a cold trap 56 was analyzed with a gas chromatograph 57. The permeances of $CO_2$ and $H_2$ (mol/$m^2$s kPa) contained the permeate gas were calculated, and the ratio ($CO_2/H_2$) of $CO_2$ permeance to $H_2$ permeance was determined. Hereinafter, this permeance ratio is referred to as "permeance ratio A0."

(2) Fabrication of Gas Separation Apparatus Including Gas Separation Membrane Element and Evaluation of Separation Efficiency (Separation Selectivity)

Using the same gas separation membrane as the gas separation membrane used in (1) above, a spiral-wound gas separation membrane element 70 was fabricated. Spiral-wound gas separation membrane element 70 was fabricated in the same manner as in (2) of Comparative Example 1, except that the above gas separation membrane was used.

Using gas separation membrane element 70, a gas separation membrane module 72 was fabricated in the same manner as in (2) of Comparative Example 1, and then the gas separation apparatus shown in FIG. 5 was fabricated.

Using the obtained gas separation apparatus including gas separation element 70, a gas separation operation was performed according to the following procedures, and the ratio ($CO_2/H_2$) of $CO_2$ permeance to $H_2$ permeance was measured.

[a] A dry nitrogen gas at a temperature of 23° C. was fed from the raw gas inlet of gas separation membrane module 72 for 12 hours to turn the gas separation membrane of gas separation membrane element 70 into a dry state. Subsequently, the retentate gas outlet was closed, and a dry nitrogen gas at 23° C. was fed to the feed side of gas separation membrane module 72 from the raw gas inlet of gas separation membrane module 72 to increase the pressure on the feed side to 1.1 MPaG. Subsequently, the feeding of the dry nitrogen gas was suspended to keep the pressure. The temperature on the feed side of gas separation membrane module 72 was the same as the temperature of the dry nitrogen gas. The pressure on the permeate side was adjusted to the atmospheric pressure.

[b] The pressure on the feed side was maintained at the above pressure value for 120 minutes. Subsequently, using a steam tube attached to the outer surface of gas separation membrane module 72, the temperature on the feed side of gas separation membrane module 72 was increased to 120° C. The pressure on the feed side of gas separation membrane module 72 after temperature increase was 1.5 MPaG.

[c] Next, the temperature on the feed side was maintained at the above temperature for 120 minutes, and then a raw gas of 1.5 MPaG and 120° C. ($CO_2$: 25.0%, $H_2$: 67.4%, $H_2O$: 7.6%) was fed to the feed side of gas separation membrane module 72 at a flow rate of 10 $Nm^3$/h. The flow rate of the raw gas was adjusted with a back-pressure controller 74 provided on the upstream side of a cold trap 75 in the middle of the discharge passage for a retentate gas. The feed-side pressure of the raw gas fed to gas separation membrane module 72 was controlled to 1.5 MPaG. The pressure on the permeate side was adjusted to the atmospheric pressure with a back-pressure controller 76.

[d] After 3 hours from the start of raw gas feeding, the permeate gas after water vapor in the permeate gas discharged from the permeate gas outlet of gas separation membrane module 72 was removed with a cold trap 77 was analyzed with a gas chromatograph 78. The permeances of $CO_2$ and $H_2$ (mol/$m^2$s kPa) contained the permeate gas were calculated, and the ratio ($CO_2/H_2$) of $CO_2$ permeance to $H_2$ permeance was determined. Hereinafter, this permeance ratio is referred to as "permeance ratio A1."

The ratio (A1/A0) of permeance ratio A1 to permeance ratio A0 was a value larger than 0.1.

What is claimed is:

1. A method for separating, from a raw gas containing a specific gas, the specific gas using a gas separation membrane module, the gas separation membrane module including a housing and a gas separation membrane element enclosed in the housing, the gas separation membrane element including a gas separation membrane including a hydrophilic resin composition layer for selectively allowing for permeation of the specific gas, the method comprising the steps of:

increasing a pressure in an interior of the gas separation membrane module;

increasing a temperature in the interior of the gas separation membrane module; and feeding the raw gas to the interior of the gas separation membrane module, in that order.

2. The method according to claim 1, wherein in the step of increasing a pressure, an inert gas is fed to increase the pressure in the interior of the gas separation membrane module.

3. The method according to claim 2, wherein the inert gas has a water partial pressure lower than a maximum saturation water vapor pressure in the step of increasing a pressure.

4. The method according to claim 1, wherein in the step of increasing a pressure, the pressure on a feed side in the interior of the gas separation membrane module is increased.

5. The method according to claim 1, wherein the raw gas contains water vapor.

6. The method according to claim 5, wherein in the step of increasing a temperature, the temperature in the interior of the gas separation membrane module is increased to a temperature higher than a dew point of the raw gas in the step of feeding the raw gas.

7. The method according to claim 1, wherein the hydrophilic resin composition layer contains a hydrophilic resin and an acidic gas carrier capable of reversibly reacting with an acidic gas.

8. The method according to claim 1, further comprising the steps of:

discharging a retentate gas that has not permeated through the gas separation membrane from the gas separation membrane module; and purifying the retentate gas.

9. The method according to claim 8, wherein in the step of purifying the retentate gas, the purifying is conducted by at least one method selected from the group consisting of an adsorption method, a physical absorption method, a chemical absorption method, a distillation method, and a cryogenic separation method.

* * * * *